(12) United States Patent
Salle et al.

(10) Patent No.: US 12,413,171 B2
(45) Date of Patent: Sep. 9, 2025

(54) ELECTRIC MOTOR SAFE STATE CONTROL

(71) Applicant: SILICON MOBILITY SAS, Valbonne (FR)

(72) Inventors: Bruno Salle, Marseilles (FR); Anselme Lebrun, Mougins (FR)

(73) Assignee: SILICON MOBILITY SAS, Valbonne (FR)

( * ) Notice: Subject to any disclaimer, the term of this patent is extended or adjusted under 35 U.S.C. 154(b) by 64 days.

(21) Appl. No.: 18/038,905

(22) PCT Filed: Nov. 27, 2020

(86) PCT No.: PCT/EP2020/083641
§ 371 (c)(1),
(2) Date: May 25, 2023

(87) PCT Pub. No.: WO2022/111813
PCT Pub. Date: Jun. 2, 2022

(65) Prior Publication Data
US 2024/0022202 A1  Jan. 18, 2024

(51) Int. Cl.
*H02P 29/02* (2016.01)
*H02P 29/024* (2016.01)
(Continued)

(52) U.S. Cl.
CPC .......... *H02P 29/027* (2013.01); *H02P 29/028* (2013.01); *H02P 29/032* (2016.02)

(58) Field of Classification Search
CPC ...... H02P 29/027; H02P 29/02; H02P 29/028; H02P 29/032
See application file for complete search history.

(56) References Cited

U.S. PATENT DOCUMENTS 9,621,079 B2 * 4/2017 Ogawa ...................... G01P 3/44
10,340,834 B2 * 7/2019 Uchida ................ H02P 29/027
(Continued)

FOREIGN PATENT DOCUMENTS

| EP | 2418116 A1 | 2/2012 |
|---|---|---|
| EP | 2683071 A1 | 1/2014 |
| EP | 2720370 A1 | 4/2014 |

OTHER PUBLICATIONS

International Search Report & Written Opinion mailed Aug. 10, 2021 in reference to co-pending European Application No. PCT/EP2020/083641 filed Nov. 27, 2020.

*Primary Examiner* — Thai T Dinh
(74) *Attorney, Agent, or Firm* — Viering, Jentschura & Partner mbB

(57) ABSTRACT

An electric motor based system includes an electric motor; an electric motor power controller for controlling the electric motor; a first control unit, adapted to provide first control signals for the electric motor power controller; an electric power storage device adapted to power the electric motor power controller; a first sensor adapted to determine information related to power exchange between the electric power storage device and the electric motor power controller; and a second control unit, wherein the second control unit is adapted to pass the first control signals, received from the first control unit, to the electric motor power controller in a first mode and adapted to provide second control signals for the electric motor power controller in a second mode; and the second control unit inputs and exploits the information.

20 Claims, 16 Drawing Sheets

(51) Int. Cl.
*H02P 29/028* (2016.01)
*H02P 29/032* (2016.01)

(56) References Cited

U.S. PATENT DOCUMENTS

2010/0100274 A1* 4/2010 Satake .................. E02F 9/2285
701/31.4
2013/0328514 A1* 12/2013 Funaba ............... H02P 29/0241
318/519
2014/0184122 A1* 7/2014 Ogawa .................. E02F 9/2095
318/461

\* cited by examiner

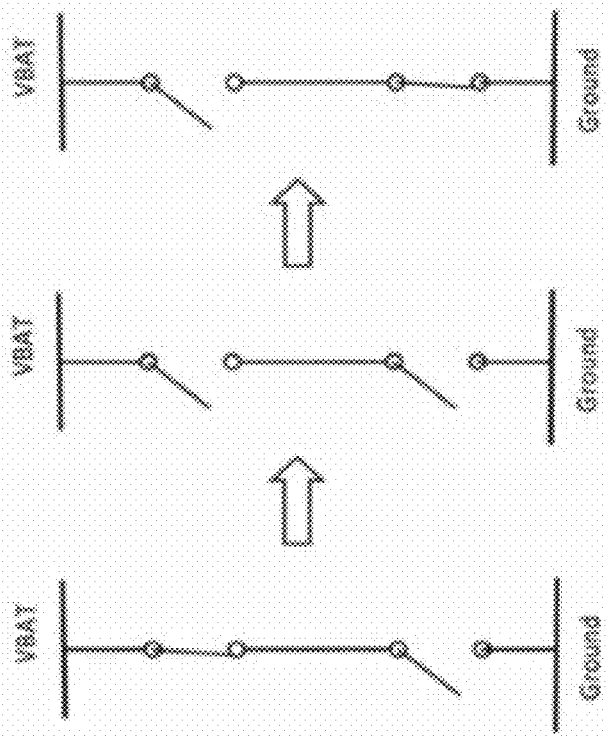
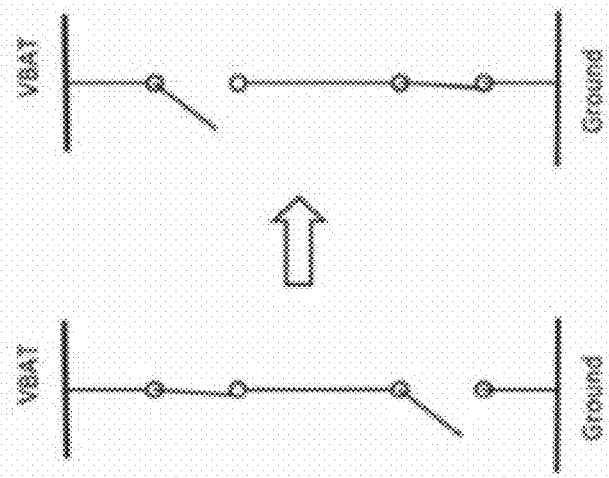
FIG. 16

ELECTRIC MOTOR SAFE STATE CONTROL

CROSS REFERENCES TO RELATED APPLICATIONS

This application is a national-stage application under 35 U.S.C. § 371 of International Application No. PCT/EP2020/083641, filed Nov. 27, 2020.

FIELD OF THE INVENTION

The invention relates to the application domain of vehicle electric motor digital control and more specifically to the domain of functional safety mechanisms associated to that.

BACKGROUND OF THE INVENTION

FIG. 5 provides a typical digital controlled electric motor system.
- 1101: The digital control system
- 1102: The electric motor power stage (aka: Inverter)
- 1103: The electric motor (here is an example with 3 phases, there may be more phases)
- 1104: The motor position sensor system
- 1105: The vehicle battery power line The invention addresses a problem that occurs when a transient or permanent fault leads to the situation where the digital control logic that drives the electric motor power transistors is no more able to properly operates.

In a vehicle, this digital controller is ASIL-D certified. This means that it contains the safety detection mechanism that can detect and report the faulty situation mentioned above. In the best-case situation, the digital controller is able to automatically contain or repair the fault in an acceptable reaction time. In this case there is no need for additional mechanism.

But in the worst-case situation, the digital controller is "dead", and an emergency logic must be activated to handle the problem. This logic is able to override digital control signals to drive a safe state of motor power stages.

FIG. 6 provides a digital controlled eMotor system with safe state handling.
- 1201: The Safe state management logic that overrides the power stage control signals.

The basic safe state that can be applied in case of faulty digital controller is the "Free wheel" mode. In this case all the power stage switches are forced to open state. As a result, the motor coils are set in open circuit configuration, as shown in FIG. 7.

As explained in FIG. 8, an edge effect of the free wheel configuration is the induction of an electromagnetic voltage on motor coils pins. Depending on the motor speed, three situation are to be considered:
- At low motor speed, this voltage is lower than the battery voltage, therefore the protection diodes (1301) are blocked. No current is injected backward to the battery. This situation is safe.
- Over a first speed threshold, the $V_{EMF}$ voltage exceeds the VBAT voltage. Then the protection diodes become passing. A current is injected backward to the battery. The battery is able to handle a certain amount of charge current. So the situation is safe until the backward current is bellow battery maximum rated charge current.
- Over a second speed threshold, the backward injected current exceeds the maximum supported by the battery. This situation is dangerous and must be avoided.

FIG. 8 illustrates the free wheel problem at high speed that the invention solves.
- 0401: First speed threshold where motor coil voltage exceeds battery voltage.
- 0402: Second speed threshold where backward injected current exceeds battery ratings.

As demonstrated above, the free wheel configuration is not a safe state at high speed. In this situation another safe state can be used: the active short circuit configuration. Is this configuration, the power stage switches are controlled such as:
- All switches on VBAT side are "open"
- All switches on ground side are "closed"

FIG. 9 illustrates an eMotor system in "active short circuit" safe state configuration.
- 1501: All motor coils are short circuited, so the electromagnetic induction voltage is
- null. Therefore there is no backward current injected to battery.

Whereas this configuration is safe with regard to battery, it has some bad edge effects that must be taken into account:
- The motor is strongly braking due to the short circuit current flowing through the coils. Motor braking without vehicle driver action may be dangerous. It may be acceptable at high speed, but not at low speed.
- Braking induces thermal energy dissipation in the system. This is to be minimized as much as possible.

The above illustrates that the management of the eMotor safe state must be more intelligent than the ones provided so far.

IT IS THE AIM OF THE INVENTION

It is the aim of the invention to provide an intelligent management of the eMotor safe state which:
- Select "active short circuit" safe state at high speed
- Use "free wheel" whenever possible

SUMMARY OF THE INVENTION

The first aspect of the invention describes an (electric) motor based system with enhanced safety, comprising: (1) an (electric) motor; (2) an (electric) motor power control means provided by controlling said (electric) motor; (3) a first (digital) control unit, adapted for providing (generating) first control signals for said (electric) motor power control means; (4) a (electric) power storage means, provided for powering said (electric) motor power control means; (5) a first sensor adapted for determining information (110) related to the power exchange between said (electric) power storage means and said (electric) motor power control means; (6) a second control unit, provided by enhanced safety, wherein said second control unit is adapted for passing said first control signals, received from said first (digital) control unit, to said (electric) motor power control means in a first mode and adapted for providing (generating) second control signals for said (electric) motor power control means in a second mode (instead of said first control signals) and wherein said second control unit inputs and exploits said information.

The second aspect of the invention described a second control unit, provided for enhanced safety, suitable for being part of an (electric) motor based system with enhanced safety, which comprises: (1) an (electric) motor; (2) an (electric) motor power control means provided by controlling said (electric) motor; (3) a first (digital) control unit, adapted for providing (generating) first control signals for said (electric) motor power control means; (4) a (electric) power storage means, provided for powering said (electric) motor power control means; (5) a first sensor adapted for determining information related to the power exchange between said (electric) power storage means and said (electric) motor power control means; the second control unit being adapted for passing said first control signals, received from said first (digital) control unit, to said (electric) motor power control means in a first mode and adapted for providing (generating) second control signals for said (electric) motor power control means in a second mode (instead of said first control signals) and wherein said second control unit inputs and exploits said information.

DETAILED DESCRIPTION OF THE DRAWINGS

FIG. 1 describes an (electric) motor based system (10), comprising: (1) an (electric) motor (20); (2) an (electric) motor power control means (30); (3) a first (digital) control unit (40); (4) a (electric) power storage means (50); (5) a first sensor (60); and (6) a second control unit (70).

FIG. 2 describes the (electric) motor based system (10) its modes of operation comprising: (a) a first mode (200), (b) a second mode (210), wherein in particular in said second mode (210) sub-modes such as free-wheel mode (220) and active short circuit mode (230) are part.

FIG. 3 describes further embodiments of FIG. 1, illustrating additional signals (140, 150) that the second control unit (70) may input, the option of the first control unit (40) using also signal (110), the option of having a motion sensor (80) and the use of the speed information (160) use by said first unit (40) and optionally even said second unit (70).

Figure 1:
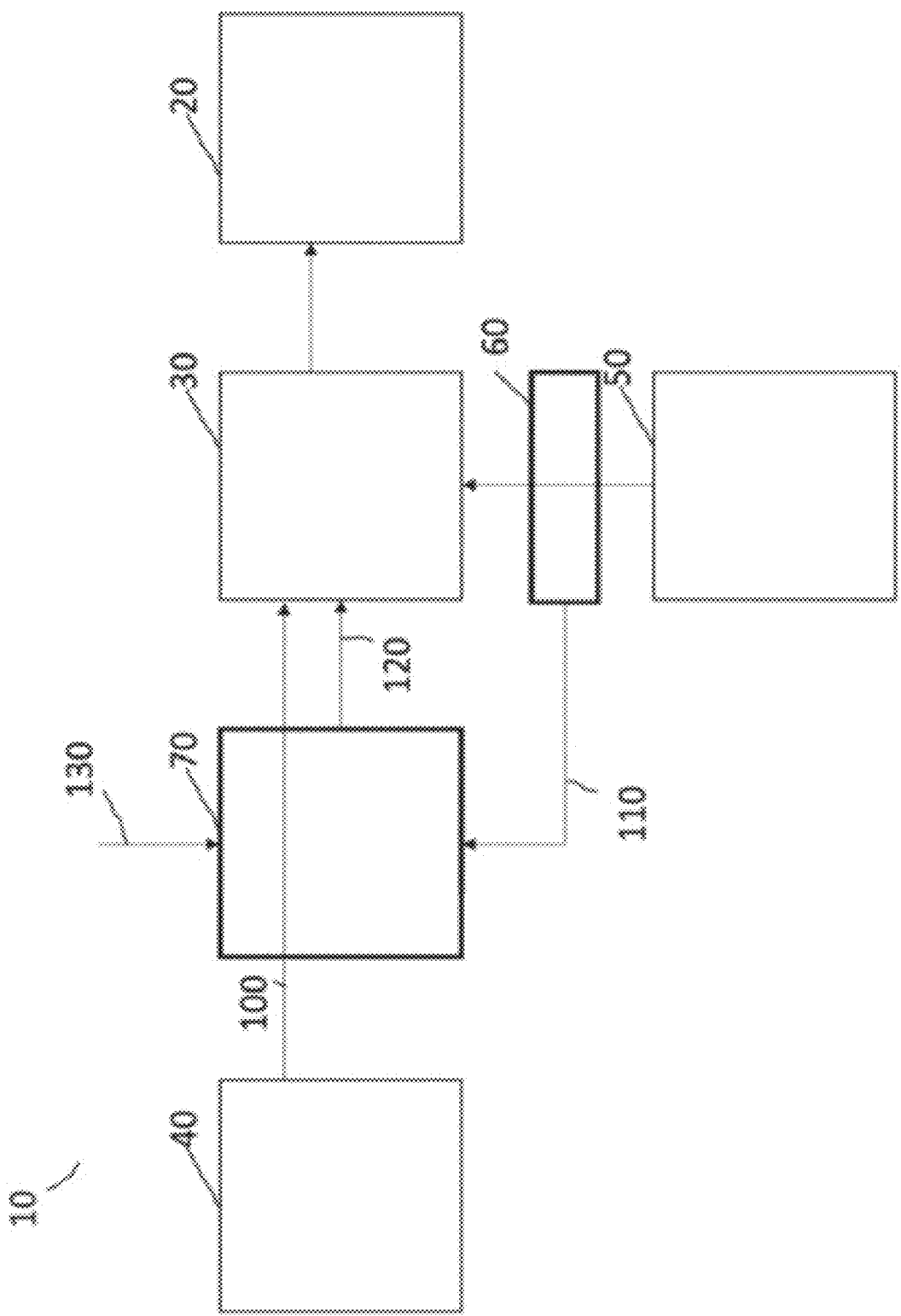
Figure 2:
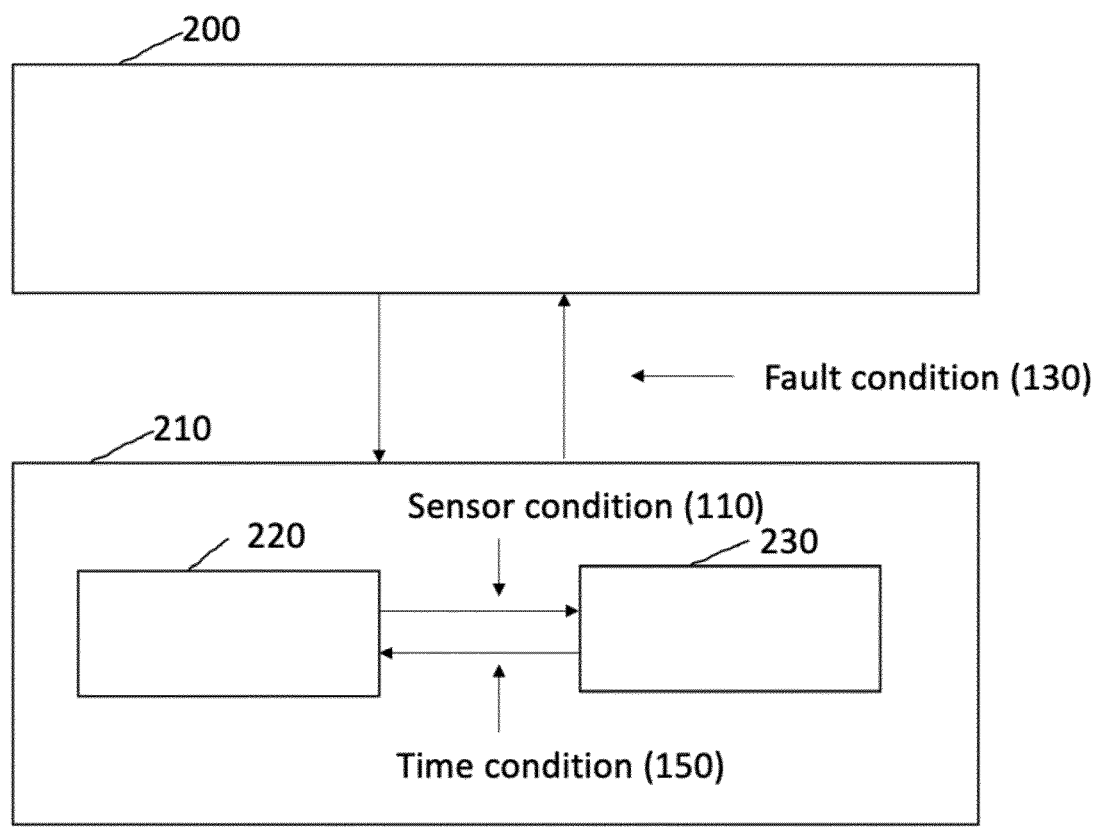
Figure 3:
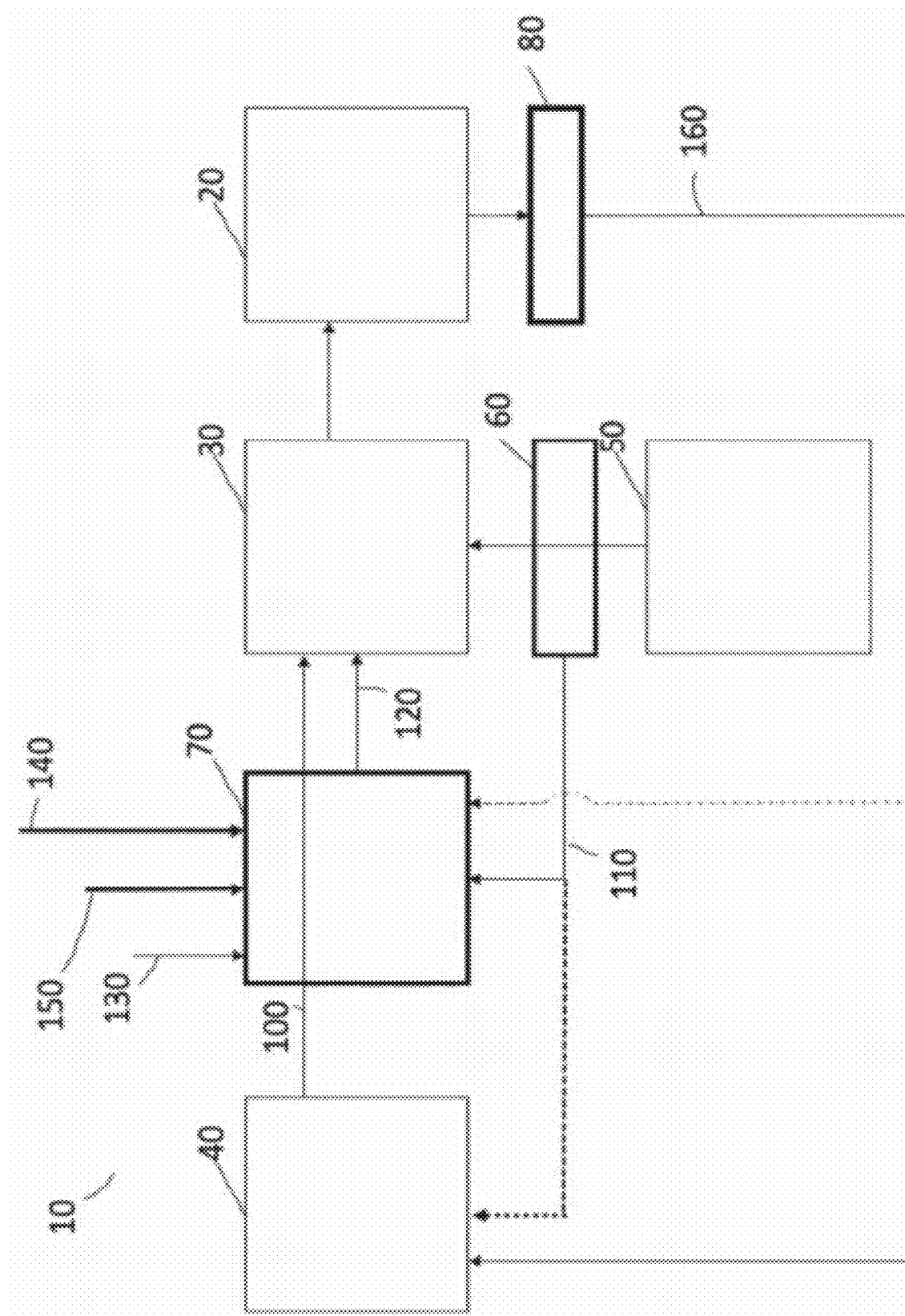
Figure 4:
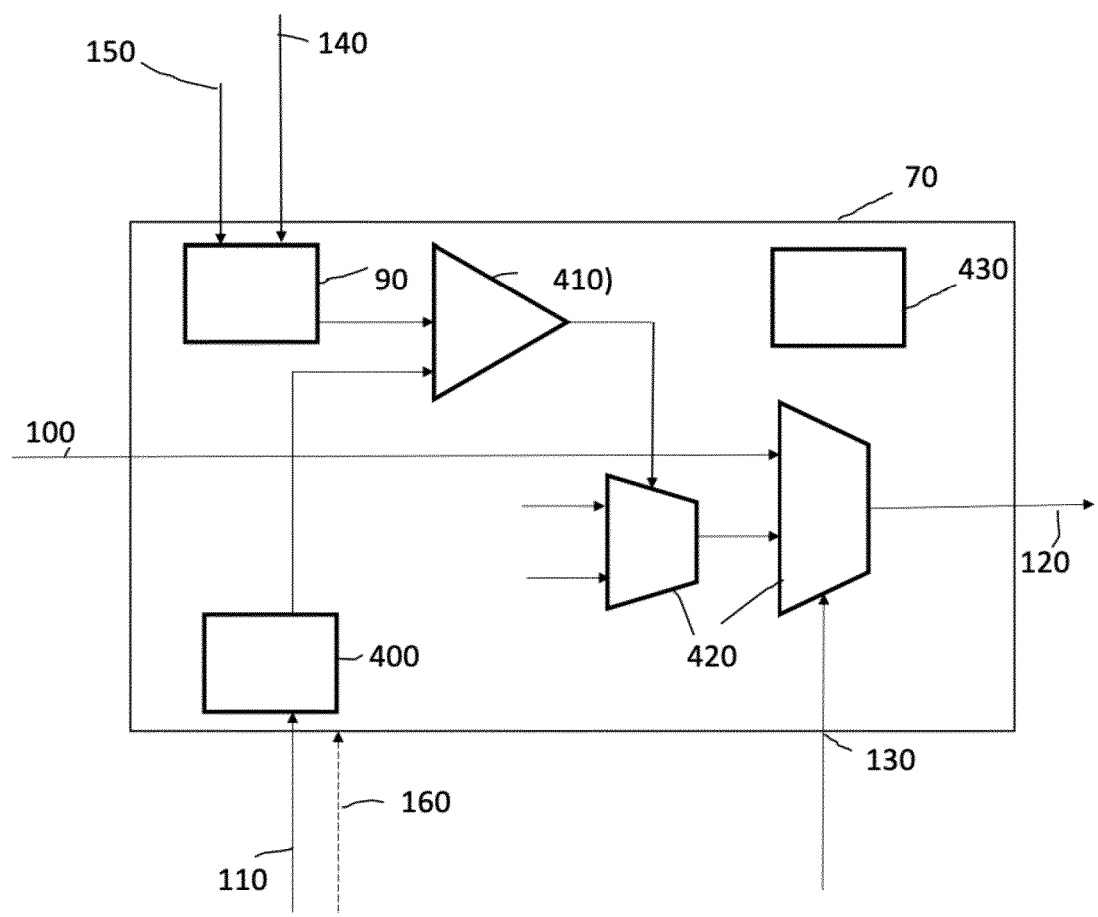
FIG. 4 shows an embodiment of the second control unit (70) with one or more elements it may comprise of such as a control logic unit (430) (which may include a timer), multiplexers (420) (note that a 2 control signal single multiplexer arrangement is also possible), a comparator (410), one or more storage means (90) and optionally an analogue-to-digital convertor (400).
Figure 5:
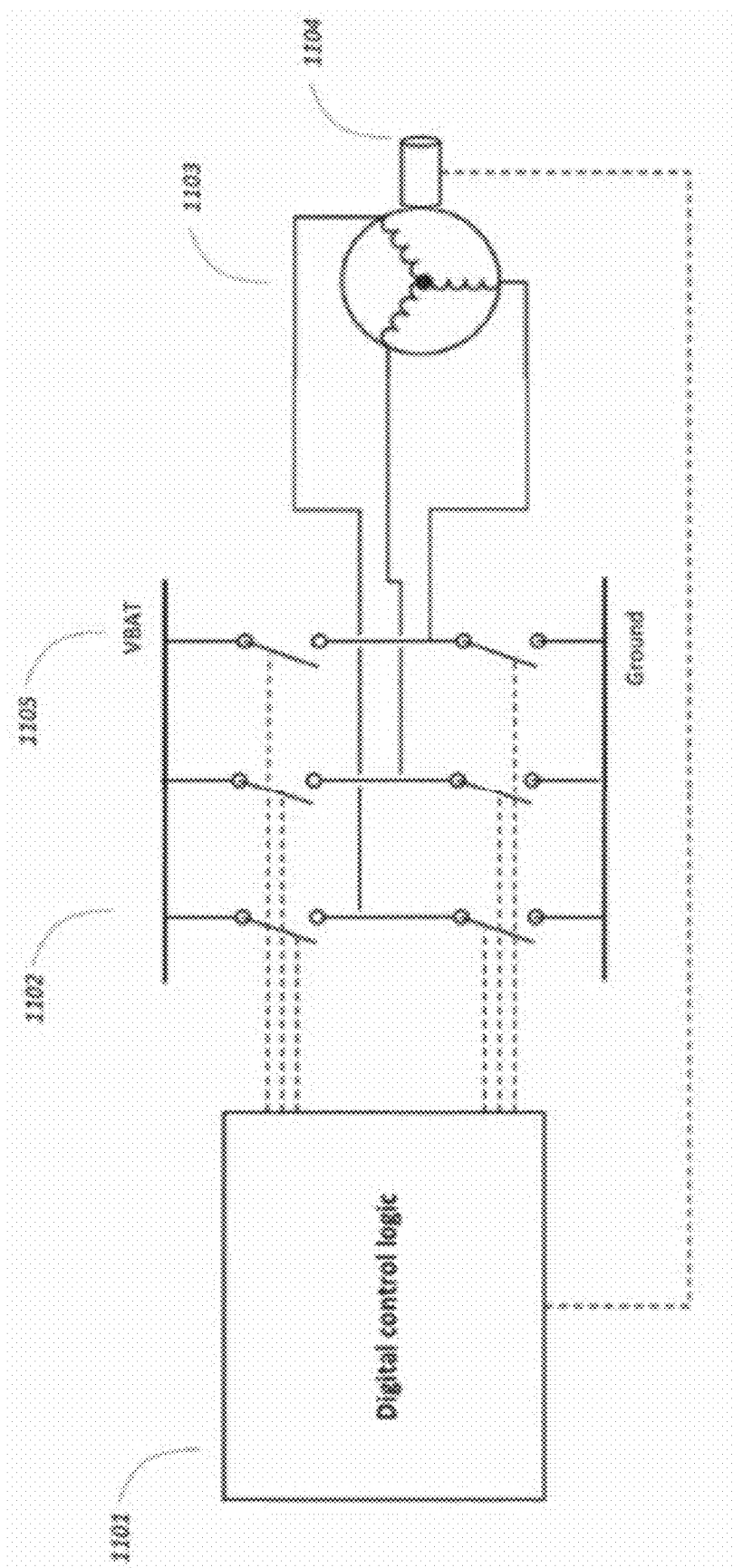
FIG. 5 shows the context of an prior-art (electric) motor based system, comprising: (1) an (electric) motor (1103); (2) an (electric) motor power control means (1102); (3) a first (digital) control unit (1101); (4) the power lines (1105) originating from a (electric) power storage means (and a speed or motion sensor (1104))
Figure 6:
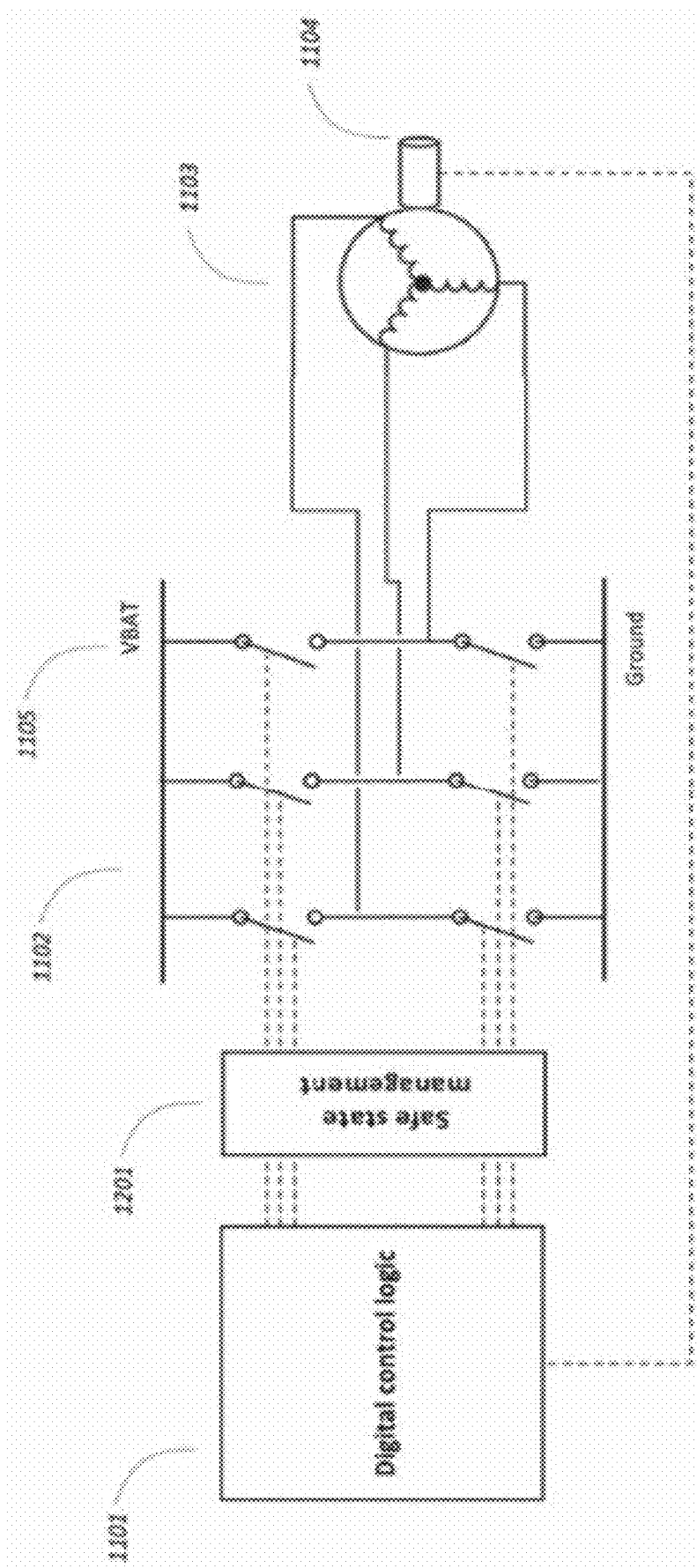
FIG. 6 shows the context of an (electric) motor based system, comprising: (1) an (electric) motor (1103); (2) the power lines (1105) originating an (electric) motor power control means (1102); (3) a first (digital) control unit (1101); (4) a (electric) power storage means (1105) (and a speed or motion sensor (1104)), with the requirement of having a safe state management unit (1201).
Figure 7:
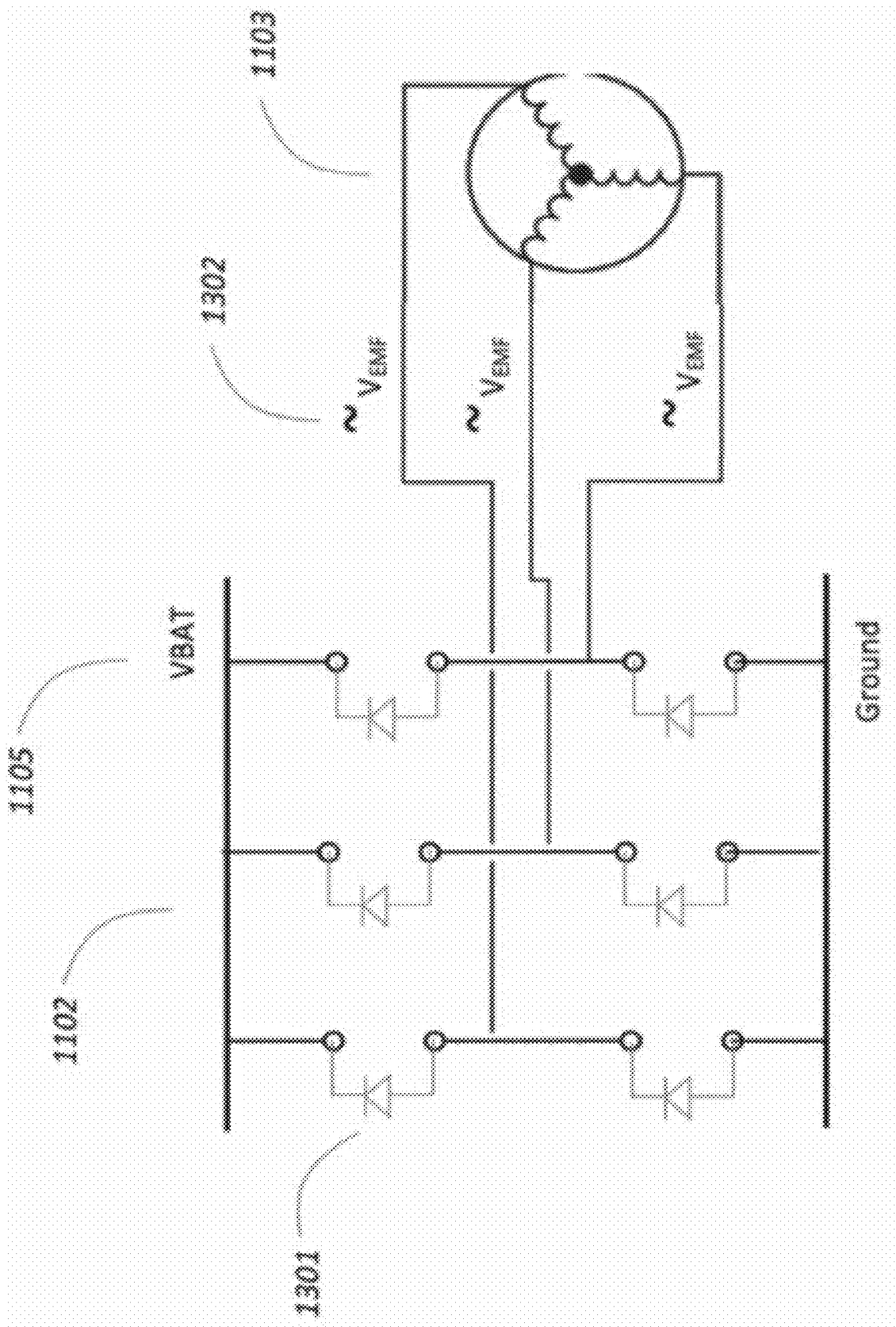
FIGS. 7 and 9 shows more detail on the an (electric) motor power control means (1102) and in particular illustrate two different modes.
Figure 8:
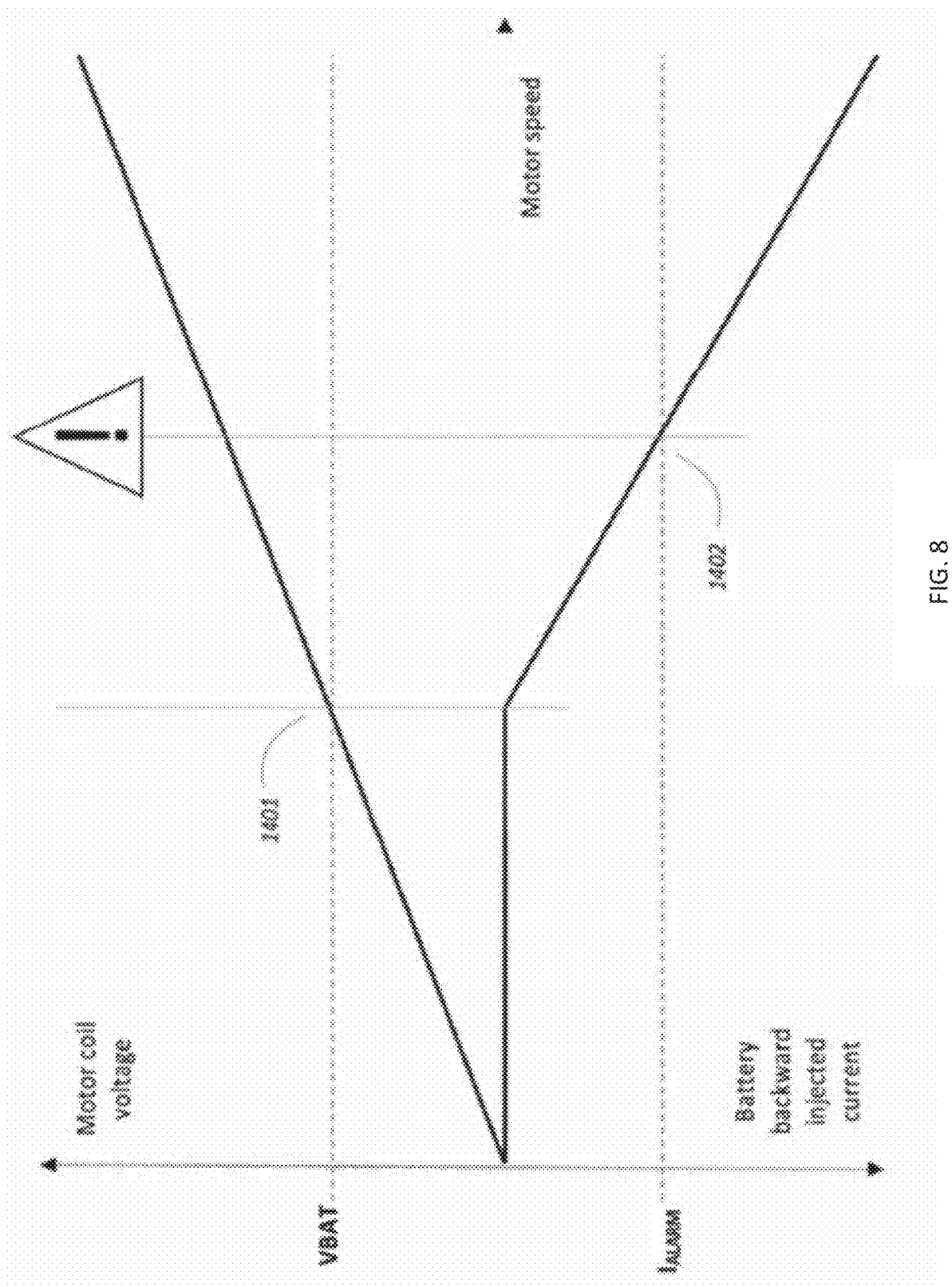
FIG. 8 shows the relationship between motor speed and the battery backward injected current excess problem the invention solves.
Figure 9:
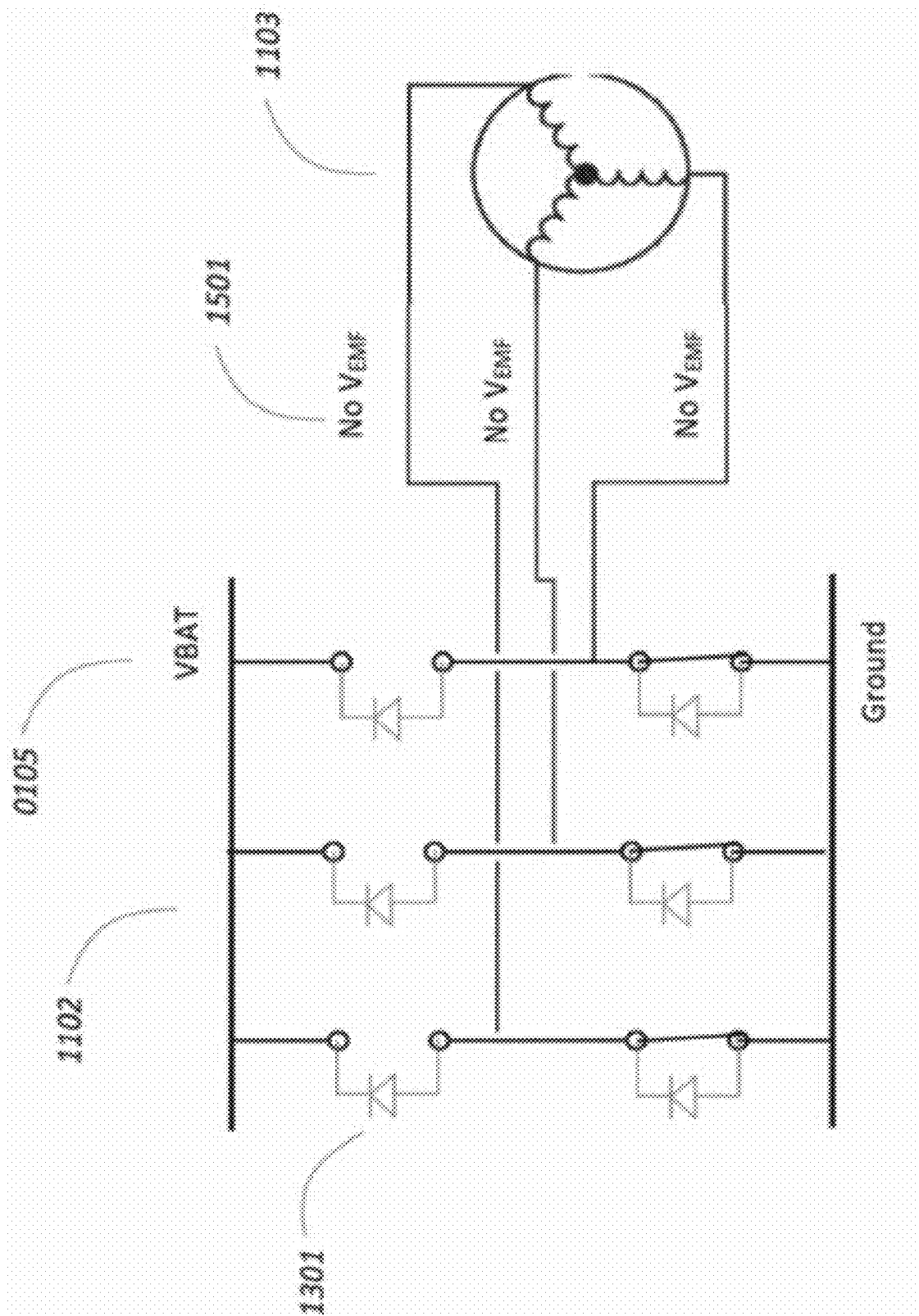
Figure 12:
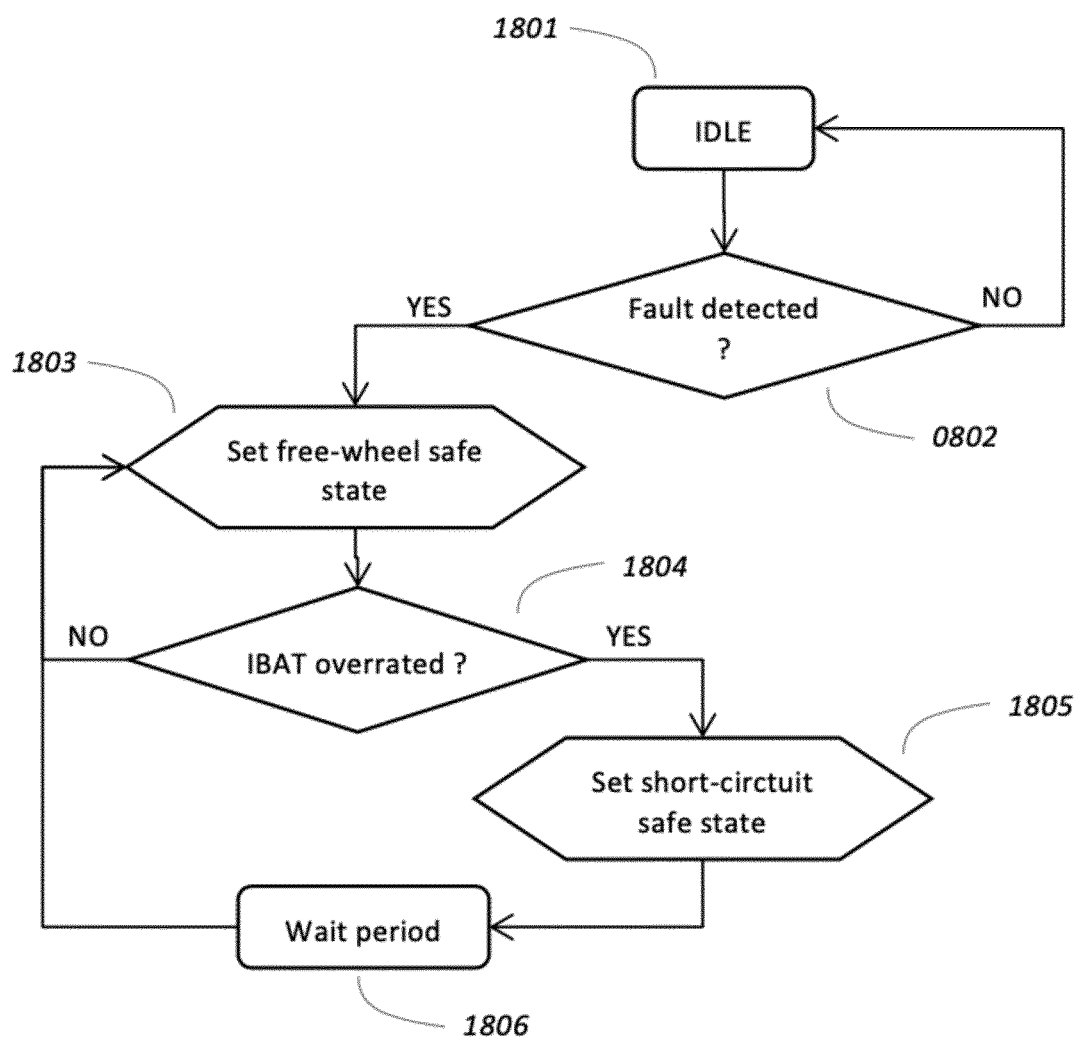

FIG. 12 provides an embodiment of the flow chart of FIG. 2.

Figure 13:
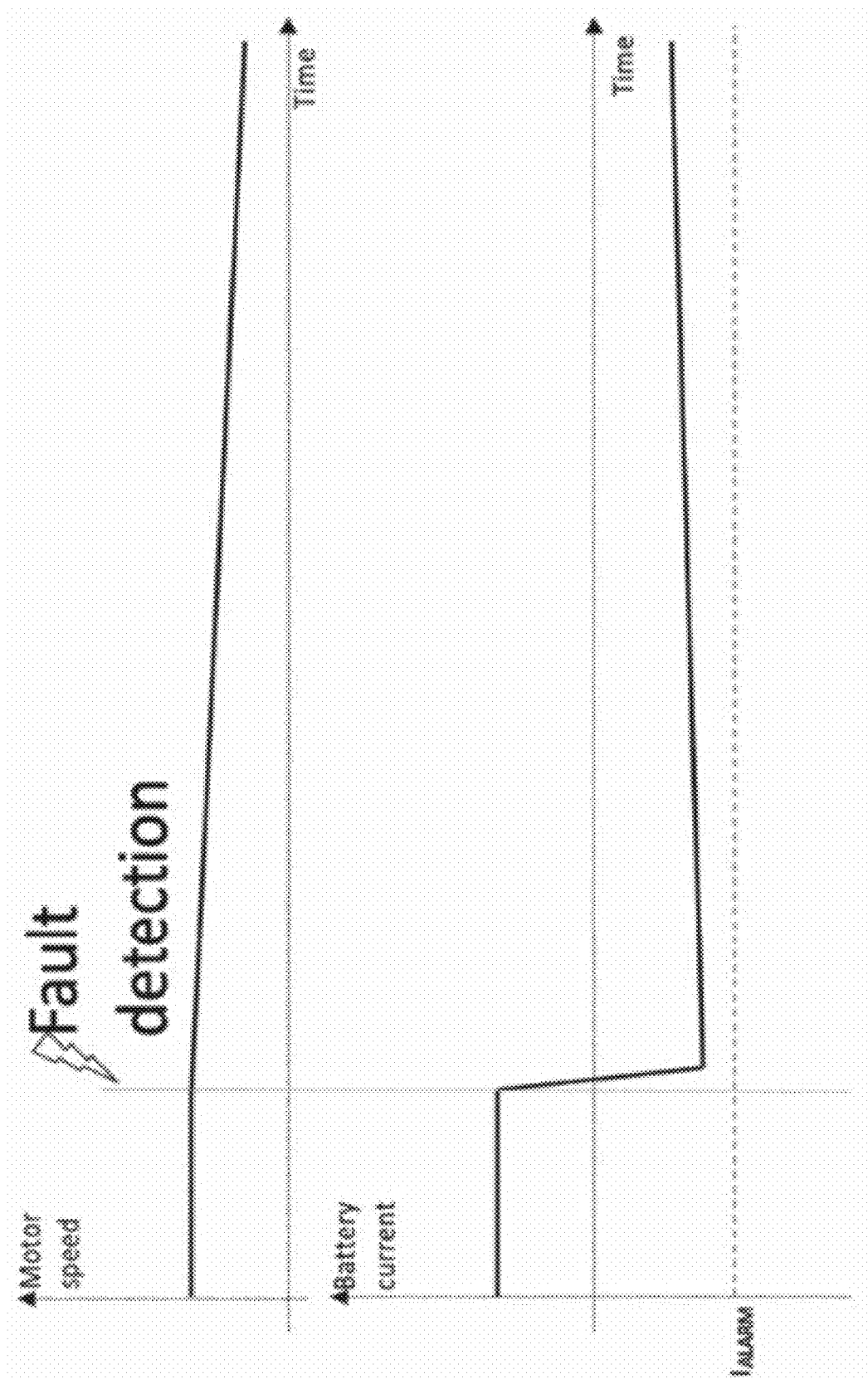
Figure 14:
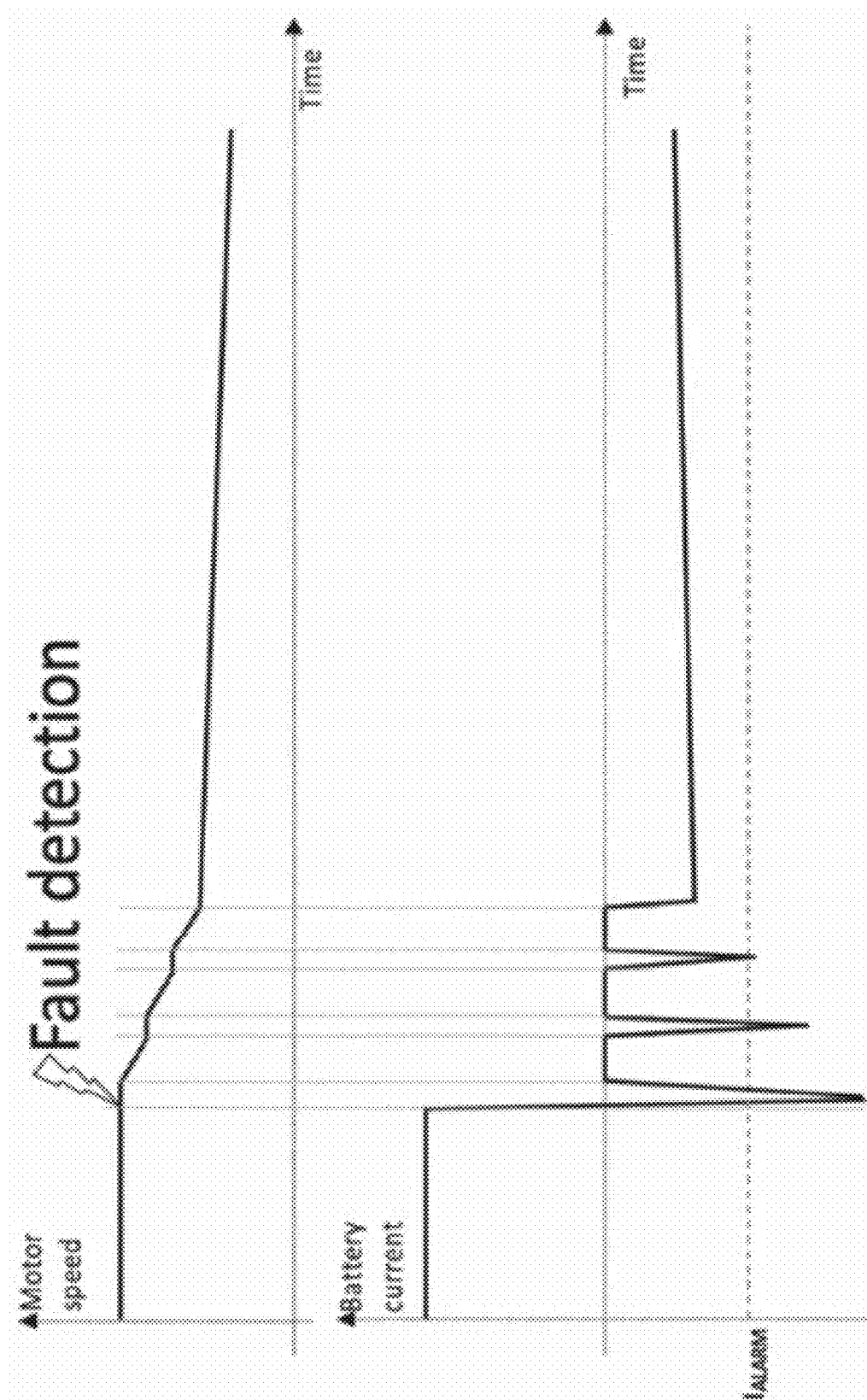
Figure 15:
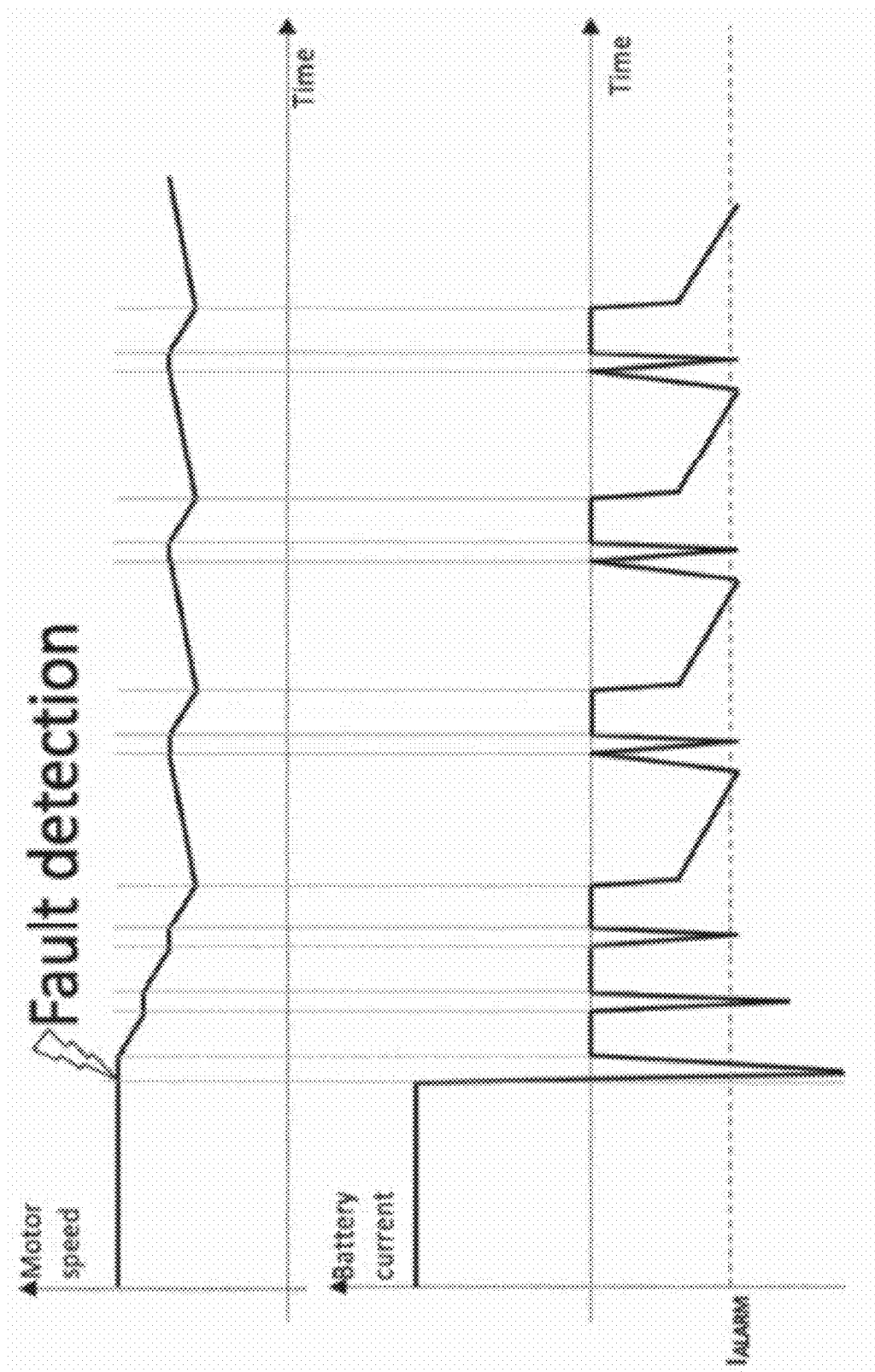

FIGS. 13, 14 and 15 illustrate the operation caused by the invented second control unit.

FIG. 16 illustrates the intrinsic safety of the proposed sequence.

DETAILED DESCRIPTION OF THE INVENTION

With reference to the prior art and the described problem to be solved, the most obvious possibility is to take benefit of the motor position sensor that exist on the system. The idea is to inject this information to the safe state manager that can deduce the motor speed based on that and therefore take the appropriate decisions.

Figure 10:
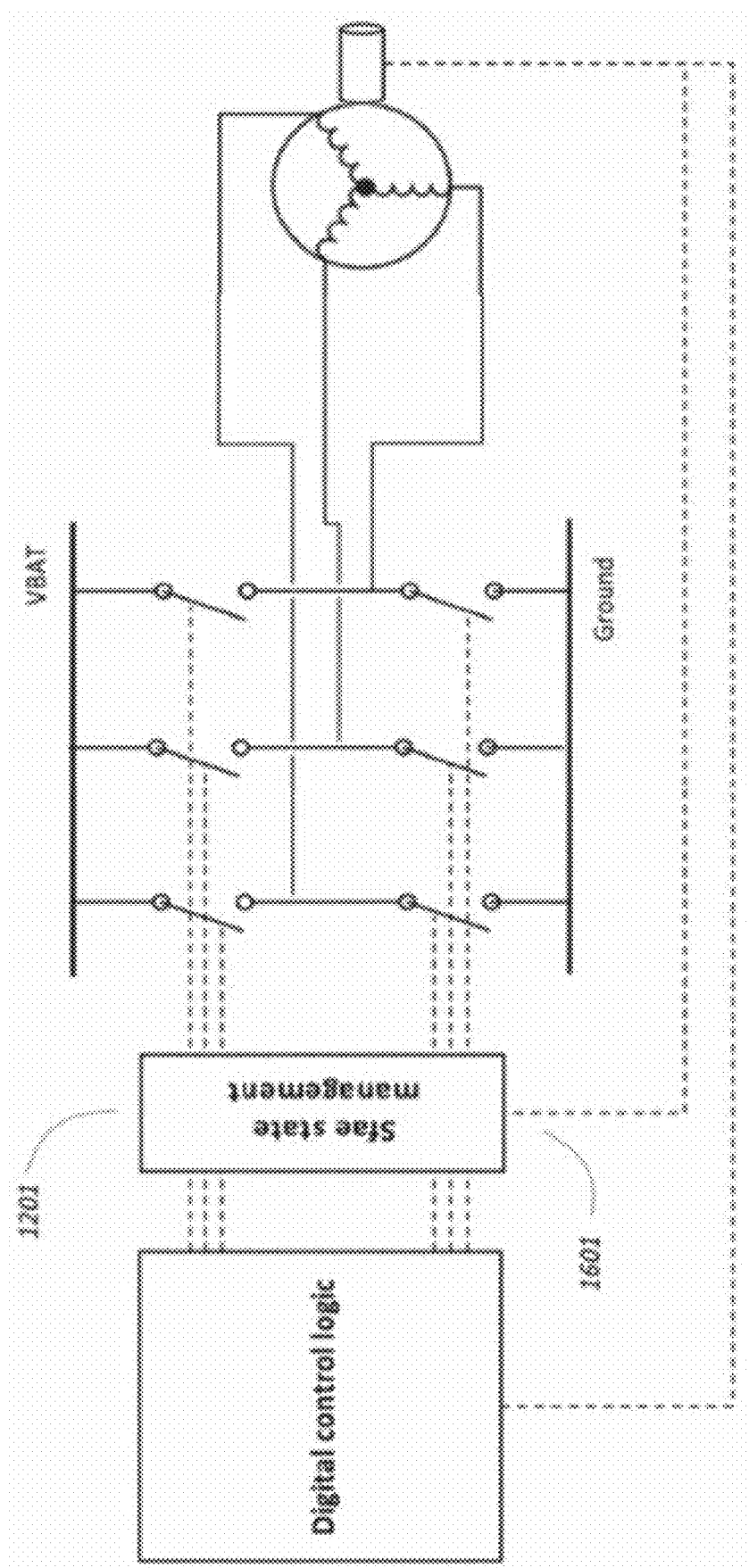
FIG. 10 shows an embodiment of FIG. 6, wherein the safe state management unit (1201) exploits speed information (1601), which may be an unsatisfactory solution if this information becomes unavailable.

FIG. 10 illustrates such "state of art" solution to the problem.

1601: Motor speed sensor is re-used by the safe-state management (0201)

The above solution suffers of several issues:

- In the case where the motor control failure comes from a position sensor defect, then the safe-state manager cannot work. The solution would be to have a redundant motor position sensor. This leads to important extra cost and mechanical constraints.
- Using the position sensor for speed evaluation is a quite complex operation. Therefore, the complexity of the safe-state manager is quite high. This is obviously a problem in terms of system cost. But also, it is a functional safety problem. The more a system is complex, the higher the risk of failure is.
- The relation between the motor speed and the resulting backward current is not obvious. It depends on complex factors (temperature, system aging, battery voltage). This means that the safe-state manager must be even more complex to compute those factors. Another solution is to take all the possible margins at design time. This is not optimal and will not allow to switch back to free wheel state at much as possible.

The invention uses another system architecture.

The invention relates to an (electric) motor based system (10) and related second control unit (70).

The invented system (10) and control unit (70) provide an enhanced safety (electric) motor (20) system, in that, when faults occur in the normal mode of operation (first mode (200)) (which may a variety of reasons such as sensors or the primary (first (digital)) control unit (40) or combinations thereof fail), and when hence proper action is required to bring the entire system in to a safe mode, hence such action to be provided with a additional (second (digital)) control unit (70)), one needs to ensure that such action does not cause additional problems such as a substantial power exchange from the (electric) motor back to said (electric) power storage means (50).

The invention describes an (electric) motor based system (10) with enhanced safety, comprising: (1) an (electric) motor (20); (2) an (electric) motor power control means (30) provided by controlling said (electric) motor (20); (3) a first (digital) control unit (40), adapted for providing (generating) first control (100) signals for said (electric) motor power control means (30); (4) a (electric) power storage means (50), provided for powering said (electric) motor power control means (30); (5) a first sensor (60) adapted for determining information (110) related to the power exchange between said (electric) power storage means (50) and said (electric) motor power control means (30); (6) a second control unit (70), provided by enhanced safety, wherein said second control unit (70) is adapted for passing said first control signals (100), received from said first (digital) control unit (40), to said (electric) motor power control means (30) in a first mode (200) and adapted for providing (generating) second control signals (120) for said (electric) motor power control means (30) in a second mode (210) (instead of said first control signals) and wherein said second control unit (70) inputs and exploits said information (110).

In an embodiment of the invention the (electric) motor based system (10) described above is provided, wherein said second control unit (70) exploits said information (110) for providing (generating) second control signals for said (electric) motor power control means (30).

In an embodiment of the invention the (electric) motor based system (10) described is provided, wherein said second control unit (70) inputs a fault signal (130) and exploits said fault signal (130) to switch between said modes.

Note the fault signal (130) may come from different sources and can optionally be a plurality of fault signals (130) to be combined. In a particular embodiment said fault signal (130) is provided by said first (digital) control unit (40).

The invention describes the (electric) motor based system (10), wherein said second control unit (70), upon receipt of said fault signal (130), provides (generates) second control signals (120) for preventing substantial power exchange from the (electric) motor to said (electric) power storage means (50), preferably second control signals (120) cause a temporal brake effect on the (electric) motor when necessary (in particular when said power exchange from the (electric) motor to said (electric) power storage means (50) is exceed a threshold).

More in particular a (electric) motor based system (10) may be provided, wherein said second control unit (70), upon receipt of said fault signal (130), provides (generates) second control signals (120) to put the (electric) motor in either free-wheel mode (220) (implying all switches open in said (electric) motor power control means (30)) or in active short circuit mode (230) (implying all switches to ground close and all switching to power open in said (electric) motor power control means (30)), depending on monitoring said information (110), preferably reassessing said information (110) after a predetermined time.

In a particular embodiment of the above in the (electric) motor based system (10) said second control unit (70), upon receipt of said fault signal (130), (a) provides (generates) second control signals (120) to put the (electric) motor in free-wheel mode (220) (implying all switches open in said (electric) motor power control means (30)); thereafter monitoring said information (110) and upon exceeding a threshold (140), (b) said second control unit (70) provides (generates) second control signals (120) to put the (electric) motor in active short circuit mode (230) (implying all switches to ground close and all switching to power open in said (electric) motor power control means (30)); and thereafter after a predetermined time (150) return to (a).

In an embodiment of the invention the (electric) motor based system (10) is provided, wherein said second control unit (70) is adapted for inputting said threshold (140). While this threshold may come from several sources one of the possibilities is from said first (digital) control unit (40).

In an embodiment of the invention the (electric) motor based system (10) is provided, wherein said second control unit (70) is adapted for inputting said predetermined time (150). While this time may come from several sources one of the possibilities is from said first (digital) control unit (40).

In the invention means to determine (especially unwanted) power exchange from the (electric) motor to said (electric) power storage means (50), like one or more sensors, even of different kind, are provided. It is sufficient that such means or sensors capable of determining or detecting a substantial power exchange, meaning one which may cause harm to the (electric) power storage means (50) are foreseen. These sensors can be analogue, requiring extra digitalization means in the system for further digital use or in itself be digital. Examples are a current sensor and a temperature sensor.

Note that typically in such (electric) motor based system (10) said (electric) motor power control means (30) comprises a plurality of pair wise serial connected switches (one pair per phase of the (electric) motor), more over most likely also each switch being provided with over-voltage protection (diodes).

Given its function to steer in normal mode the motor said first (digital) control unit (40) is typically a hardware programmable unit, preferably a programmable logic matrix.

Given its function to operate in essence in safe mode, the second (digital) control unit (70) may be a hardware block of various kind, but typically it is of a lower complexity of said first (digital) control unit (40), to avoid failure of itself as much as possible, hence programmability might be rather limited, for instance to inputting the parameters mentioned above.

It is to be appreciated that the introduction of extra hardware likes the second control unit and the required sensors is an extra cost to be considered in the entire design. As this introduction is required for the enhanced safety, trying to take most advantage of such presence is recommended. Therefore in one embodiment of the invention, said first control unit (40) (if still operational or capable to do so, hence if it not entirely fails) also exploits said information (110), for instance to initiate further protection measures like cooling of said (electric) power storage means (50), change motor control algorithm, change motor torque regulation point and/or Communicate information to other systems of the vehicle It is worth mentioning that the described (electric) motor based system (10) typically comprising a (motion) sensor (80), suitable for determining speed information (160), wherein said first control unit (40) (also and/or in normal mode only (meaning not requires current information) exploits said speed information (160). Note that failure of the speed sensor may precisely be the cause of going into safety mode.

Note however that the invention can also work for systems without motion sensors but use position estimates based on motor coil current.

Taking the same considerations into account based the presence of (additional) hardware and trying to make most advantage of such presence, one may opt to adapt said second control unit (70) to also exploits said speed information (160) (if still available), for instance to verify whether the braking effect, it should cause in a certain mode temporally and under certain circumstances, is achieved. This introduction of such option is subject to the requirement of keeping the complexity low.

The invention provides hence a second control unit (70), provided for enhanced safety, suitable for being part of an (electric) motor based system (10) with enhanced safety, which comprises: (1) an (electric) motor (20); (2) an (electric) motor power control means (30) provided by controlling said (electric) motor (20); (3) a first (digital) control unit (40), adapted for providing (generating) first control (100) signals for said (electric) motor power control means (30); (4) a (electric) power storage means (50), provided for powering said (electric) motor power control means (30); (5) a first sensor (60) adapted for determining information (110) related to the power exchange between said (electric) power storage means (50) and said (electric) motor power control means (30); the second control unit (70) being adapted for passing said first control signals (100), received from said first (digital) control unit (40), to said (electric) motor power control means (30) in a first mode (200) and adapted for providing (generating) second control signals (120) for said (electric) motor power control means (30) in a second mode (210) (instead of said first control signals) and wherein said second control unit (70) inputs and exploits said information (110).

In an embodiment of the invention, said second control unit (70), comprises storage means (90), to store said threshold (140) and/or said predetermined time (150).

In an embodiment of the invention said second control unit (70), comprises an analog-to-digital convertor (400) to digitize said information (110) (and optionally even said speed information (160)).

In an embodiment of the invention said second control unit (70), comprises a comparator (410) to verify whether said information (110) exceeds said threshold.

In an embodiment of the invention said second control unit (70), comprises one or more selectors (multiplexers) (420) for selecting between (the control signals applicable for) said modes (200, 210, 220) based on said fault signal (130) and/or the outcome (170) of said comparator (410).

In an embodiment of the invention said second control unit (70), comprises a control logic unit (430), implementing a state machine, for changing between said modes (200, 210, 220).

To ensure that the addition of the second control unit itself result in safe operation, the second control unit (70) is being designed with a reaction time shorter than the dead-time of the motor control, hence a low complex hardware circuit is recommendable.

Finally, given the above mentioned considerations on cost and efficient use of hardware and information, one may use a second control unit with more elaborated features or even use of a more complex one in a particular mode and revert to another simpler one (as the ones described above with the methods) in case the complex one fails. Such consideration always need to be balanced with a safety impact analysis (safety should be enhanced and not jeopardized) and the timing aspect indicated above must be respected also. A possible hierarchical approach is outlined in the following embodiment wherein the second control unit (70), exploits said information (110) (indirectly) by during normal (non-fault operation) inputting (motion) sensor (80) information, suitable for determining speed information (160), determining a relationship between said speed information (160) and said information (110) related to the power exchange between said (electric) power storage means (50) and said (electric) motor power control means (30); and upon receipt of said fault signal (130), exploit this relationship in combination with speed information (160) to derive computed information ((180) for providing (generating) second control signals for said (electric) motor power control means (30) by (a) providing (generating) second control signals (120) to put the (electric) motor in free-wheel mode (220) (implying all switches open in said (electric) motor power control means (30)); thereafter monitoring said computed information (180) and upon exceeding a threshold (140), (b) said second control unit (70) provides (generates) second control signals (120) to put the (electric) motor in active short circuit mode (230) (implying all switches to ground close and all switching to power open in said (electric) motor power control means (30)); and thereafter after a predetermined time (150) return to (a), optionally in case said motion sensor is no longer available, apply the 3 mode procedure described earlier.

Figure 11:
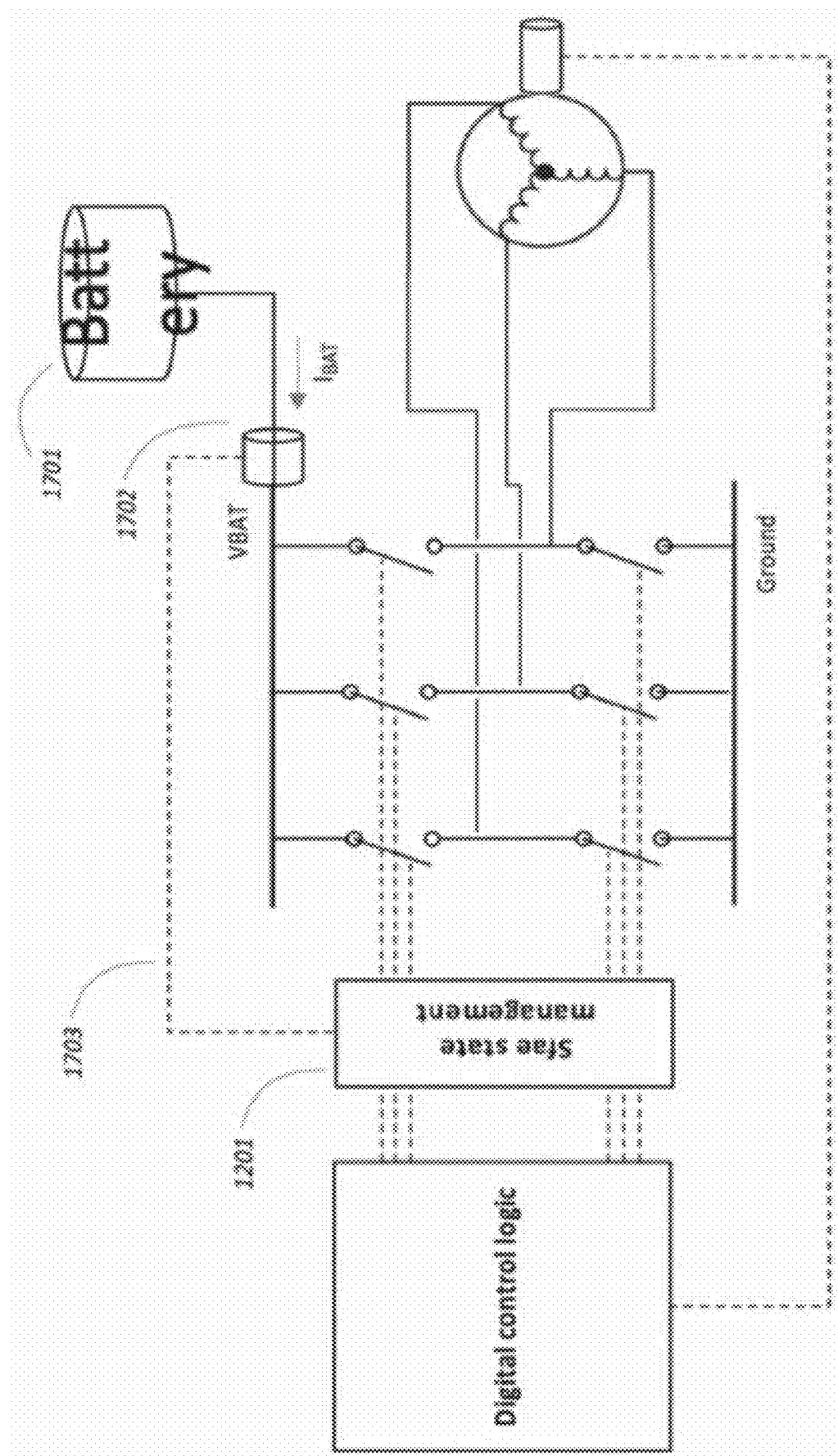
FIG. 11 shows an embodiment of FIG. 6, wherein the safe state management unit (1201) or second control unit (70) in accordance with the invention exploits sensor information (1703), originating from sensor (1702), placed in the between the power source or battery (1701) and the power lines.

The invention uses a system architecture as shown in FIG. 11.

1701: The vehicle battery
1702: A current sensor is added on battery power line to measure battery current ($I_{BAT}$)
1703: The measured battery current is used by the safe state manager (1201)

FIG. 12 explains the behavior of the safe state manager:
1801: This is the normal operation state. In this state, the safe-state manager does not have any influence on the system.
1802: Whenever a fault is reported by the logic controller fault manager, then the state-state manager is activated
1803: The first action is to immediately set the system in "free-wheel" safe mode.
1804: Then the safe-state manager continuously monitors the current level reported by the VBAT current sensor.
If the backward injected current is bellow battery maximum rating, then the system is maintained in free-wheel state
Else, the system is switched to short-circuit safe state
1805: In short circuit safe state the motor braking. The battery current is no more relevant because of the VBAT power switches set to "open" state. So, in this situation, the safe-state manager has no clue for deciding to switch back to free-wheel state.
1806: The short-circuit state is maintained for an arbitrary amount of time, then a tentative switch back to free-wheel is done. At this stage, the above sequence is played again.

FIGS. 13, 14, 15 are showing the resulting system behavior is different motor speed conditions:

In the situation of FIG. 13, the fault occurs when the motor is at low speed, then the safe-state manager keeps the system in free-wheel because backward current never exceeds battery ratings In the situation of FIG. 14, the fault occurs when the motor is at high speed. The safe-state manager starts with free-wheel but detects high backward current. Then is immediately switches to short-circuit for an arbitrary amount of time. The it tries again the free-wheel. This sequence happens several times until the backward current in free-wheel is under battery ratings.

In the situation of FIG. 15, the fault occurs when the motor is at high speed. The sequence starts like previous example. But for some reason, the vehicle accelerates again in free-wheel (descending road). The proposed solution is able to react to this situation dynamically.

While a safety issue may be opposed to the proposed solution:
Obviously, the solution allows the backward current to exceed the battery rating during a short period corresponding to the time required for the safe-state manager to detect the over current and switch to short-circuit state.

To demonstrate that this issue has no consequence on system safety we need to consider the dead-time topic.

The dead-time is a normal operation action that must be used each time the power switch controls are inverted. In this situation, because of the propagation delay uncertainty, there may be a transient short circuit in the system. This is highly damageable! To avoid this situation, a short period of "all open" state if inserted. FIG. 16 explains this.

As you can see, the intermediate dead-time configuration is exactly the same as the "free-wheel" safe state situation.

And, we can assume that the of the safe-state manager reaction time is of the same order of duration as the above normal operation dead-time.

So, the transient over-current of free-wheel in the invention is no more dangerous than the normal motor control.

The invention claimed is:

1. An electric motor based system, comprising:
    an electric motor;
    an electric motor power controller for controlling the electric motor;
    a first control unit, adapted to provide first control signals for the electric motor power controller;
    an electric power storage device adapted to power the electric motor power controller;
    a first sensor adapted to determine information related to power exchange between the electric power storage device and the electric motor power controller; and
    a second control unit,
    wherein:
    the second control unit is adapted to pass the first control signals, received from the first control unit, to the electric motor power controller in a first mode and adapted to provide second control signals for the electric motor power controller in a second mode;
    the second control unit inputs and exploits the information;
    the second control unit inputs a fault signal and exploits the fault signal to switch between the modes; and
    upon receipt of the fault signal:
        (a) the second control unit provides second control signals to put the electric motor in free-wheel mode, thereafter monitoring the information; and
        (b) upon exceeding a threshold, the second control unit provides second control signals to put the electric motor in active short circuit mode; and thereafter
        (c) after a predetermined time of the electric motor being in active short circuit mode, return to (a).

2. The electric motor based system of claim 1, wherein the second control unit exploits the information for providing second control signals for the electric motor power controller.

3. The electric motor based system of claim 1, wherein the second control unit, upon receipt of the fault signal, provides second control signals for preventing substantial power exchange from the electric motor to the electric power storage device.

4. The electric motor based system of claim 1, wherein the second control unit, upon receipt of the fault signal, provides second control signals to put the electric motor in either free-wheel mode or in active short circuit mode, depending on monitoring the information.

5. The electric motor based system of claim 1, wherein the first sensor comprises one or more motor coil current sensors.

6. The electric motor based system of claim 1, wherein the first sensor is a temperature sensor.

7. The electric motor based system of claim 1, wherein the electric motor power controller comprises a plurality of pair wise serial connected switches.

8. The electric motor based system of claim 1, further comprising a sensor for determining speed information, wherein the first control unit exploits the speed information and/or the information related to the power exchange between said electric power storage device.

9. The electric motor based system of claim 1, wherein the second control unit comprises a control logic unit, implementing a state machine, for changing between the modes.

10. A second control unit, suitable for being part of an electric motor based system, wherein:
    the electric motor based system comprises:
        an electric motor;
        an electric motor power controller that controls the electric motor;
        a first control unit, that provides first control signals for the electric motor power controller;
        an electric power storage device that powers the electric motor power controller; and
        a first sensor adapted to determine information related to power exchange between the electric power storage device and the electric motor power controller,
    the second control unit is adapted to pass the first control signals, received from the first control unit, to the electric motor power controller in a first mode and is adapted to provide second control signals for the electric motor power controller in a second mode;
    the second control unit inputs and exploits the information;
    the second control unit is adapted to input a fault signal and exploit the fault signal to switch between the first mode and the second mode; and
    upon receipt of the fault signal:
        (a) the second control unit provides second control signals to put the electric motor in free-wheel mode, thereafter monitoring the information; and
        (b) upon exceeding a threshold, the second control unit provides second control signals to put the electric motor in active short circuit mode; and thereafter
        (c) after a predetermined time of the electric motor being in active short circuit mode, return to (a).

11. The second control unit of claim 10, adapted to exploit the information for providing second control signals for the electric motor power controller.

12. The second control unit of claim 10, wherein the second control unit, upon receipt of the fault signal, provides second control signals for preventing substantial power exchange from the electric motor to the electric power storage device.

13. The second control unit of claim 10, wherein the second control unit, upon receipt of the fault signal, provides second control signals to put the electric motor in either free-wheel mode or in active short circuit mode, depending on monitoring the information.

14. The second control unit of claim 10, comprising a control logic unit, implementing a state machine, for changing between the modes.

15. The second control unit of claim 10, is designed with a reaction time shorter than the dead-time of the motor control.

16. The second control unit of claim 10, wherein the second control logic unit overrides the power stage control signals of the first control logic unit.

17. The second control unit of claim 10, configured so that when the electric motor based system is in the first mode, upon receipt of the fault signal, the electric motor based system goes in to the second mode.

18. The second control unit of claim 10, wherein the fault signal is caused by failure of the motion sensor used by the first control unit and/or a wrong operation of the first control unit.

19. The second control unit of claim 10, wherein the second control unit is a hardware programmable unit.

20. A control unit, suitable for being part of an electric motor based system, wherein:

the electric motor based system comprises:
 an electric motor;
 an electric motor power controller adapted to control the electric motor;
 an electric power storage device adapted to power the electric motor power controller; and
 a first sensor adapted to determine information related to power exchange between the electric power storage device and the electric motor power controller;

the control unit is adapted to provide first control signals for the electric motor power controller in a first mode and is adapted to provide second control signals for the electric motor power controller in a second mode;

the control unit inputs and exploits the information;

the control unit inputs a fault signal and exploits the fault signal to switch between the first mode and the second mode; and upon receipt of the fault signal:

(a) the control unit provides second control signals to put the electric motor in free-wheel mode, thereafter monitoring the information; and (b) upon exceeding a threshold, the control unit provides second control signals to put the electric motor in active short circuit mode; and thereafter (c) after a predetermined time of the electric motor being in active short circuit mode, return to (a).

\* \* \* \* \*